United States Patent
Krüger et al.

(10) Patent No.: US 11,851,366 B2
(45) Date of Patent: Dec. 26, 2023

(54) SITE-SPECIFIC CONNECTING OF GLASS SUBSTRATES

(71) Applicant: LPKF LASER & ELECTRONICS AG, Garbsen (DE)

(72) Inventors: Robin Krüger, Hannover (DE); Roman Ostholt, Langenhagen (DE); Norbert Ambrosius, Garbsen (DE); Oktavia Ostermann, Hannover (DE); Bernd Rösener, Porta Westfalica (DE); Daniel Dunker, Hannover (DE); Arne Schnoor, Hannover (DE); Malte Schulz-Ruhtenberg, Wunstorf (DE)

(73) Assignee: LPKF LASER & ELECTRONICS AG, Garbsen (DE)

( * ) Notice: Subject to any disclaimer, the term of this patent is extended or adjusted under 35 U.S.C. 154(b) by 51 days.

(21) Appl. No.: 17/420,879

(22) PCT Filed: Jan. 29, 2020

(86) PCT No.: PCT/EP2020/052199
§ 371 (c)(1),
(2) Date: Jul. 6, 2021

(87) PCT Pub. No.: WO2020/157156
PCT Pub. Date: Aug. 6, 2020

(65) Prior Publication Data
US 2022/0089482 A1    Mar. 24, 2022

(30) Foreign Application Priority Data

Feb. 1, 2019   (DE) ............................ 102019201351

(51) Int. Cl.
*B32B 3/24* (2006.01)
*C03C 27/08* (2006.01)
(Continued)

(52) U.S. Cl.
CPC .............. *C03C 27/08* (2013.01); *B32B 3/266* (2013.01); *B32B 17/06* (2013.01);
(Continued)

(58) Field of Classification Search
CPC ..... Y10T 428/24339; Y10T 428/24347; C03C 27/06
See application file for complete search history.

(56) References Cited

U.S. PATENT DOCUMENTS 6,528,141 B1 * 3/2003 Watson .............. B24D 18/0045
428/140
8,021,906 B2   9/2011 Knechtel
(Continued)

FOREIGN PATENT DOCUMENTS

| | | |
|---|---|---|
| CN | 201288133 Y | 6/2008 |
| CN | 201288134 Y | 8/2009 |
| JP | 2018137131 A | 8/2018 |

OTHER PUBLICATIONS

German Office Action from the corresponding German Patent Application No. 102019201351.1, dated Mar. 24, 2022.
(Continued)

*Primary Examiner* — William P Watkins, III
(74) *Attorney, Agent, or Firm* — Greer, Burns & Crain, Ltd.; Steven P. Fallon

(57) ABSTRACT

The invention relates to a process for connecting glass substrates which allows glass substrates to be aligned in a site-specific manner and to subsequently be connected to one another, and to the site-specifically aligned and interconnected glass substrates. Generally, the process relates to connecting glass substrates to one another, optionally also without site-specific alignment. The interconnected glass substrates obtainable by processes according to the invention are characterized by a firm bond with one another, which is preferably formed by solidified glass solder that is
(Continued)

Figure 3:
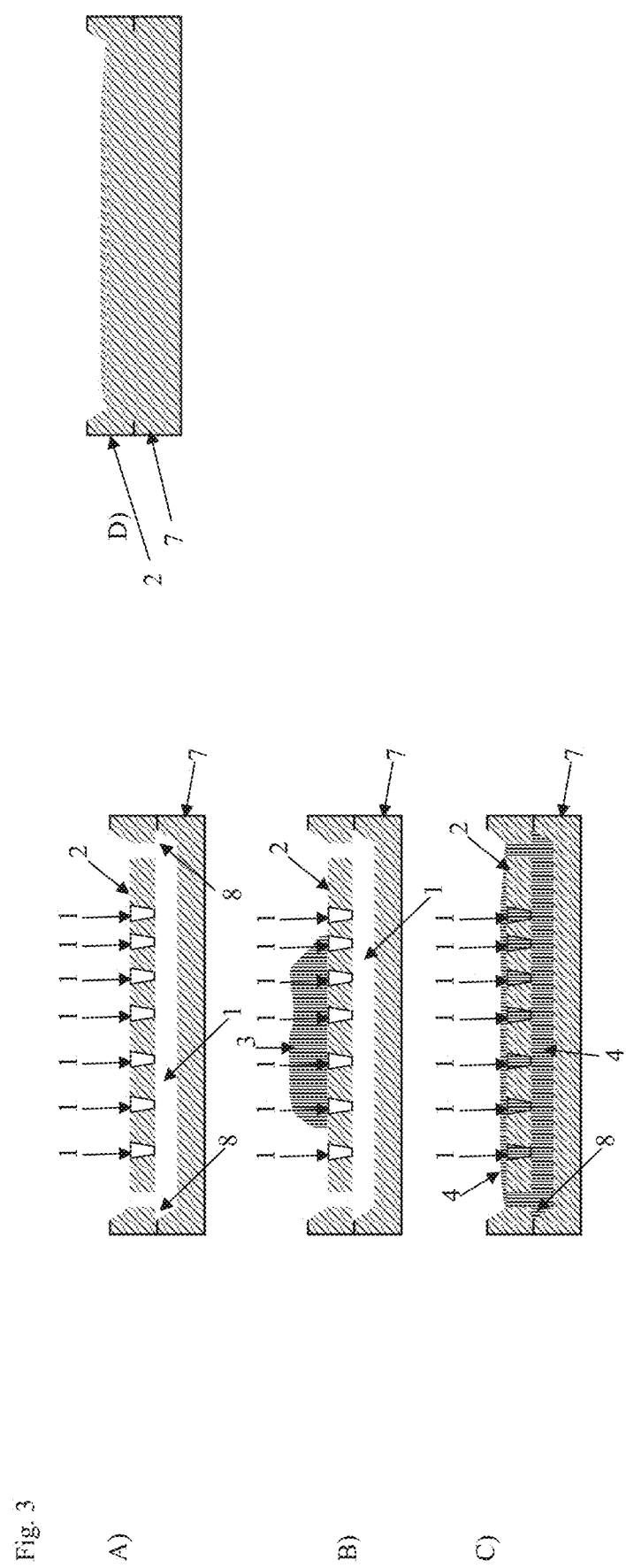

in form-fitting engagement with the glass substrates. Therein, recesses, which are preformed in the glass substrate, with glass solder are used for aligning and optionally for connecting the glass substrates.

14 Claims, 7 Drawing Sheets

(51) Int. Cl.
    *B32B 3/26*     (2006.01)
    *B32B 17/06*     (2006.01)
    *C03C 23/00*     (2006.01)

(52) U.S. Cl.
    CPC ... *C03C 23/0025* (2013.01); *Y10T 428/24339* (2015.01); *Y10T 428/24347* (2015.01)

(56) References Cited

U.S. PATENT DOCUMENTS

| | | |
|---|---|---|
| 9,236,274 B1 | 1/2016 | Mobley et al. |
| 2012/0202010 A1 | 8/2012 | Uchida |
| 2013/0319496 A1 | 12/2013 | Karpowich et al. |

OTHER PUBLICATIONS

International Search Report and Written Opinion from the corresponding International Patent Application No. PCT/EP2020/052199, dated Apr. 6, 2020.

\* cited by examiner

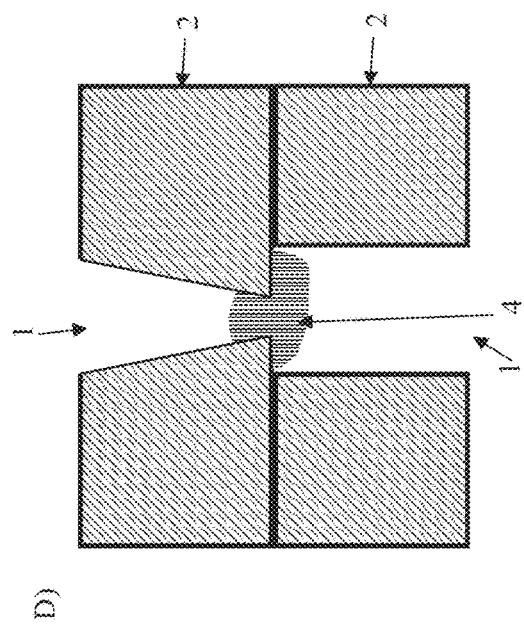
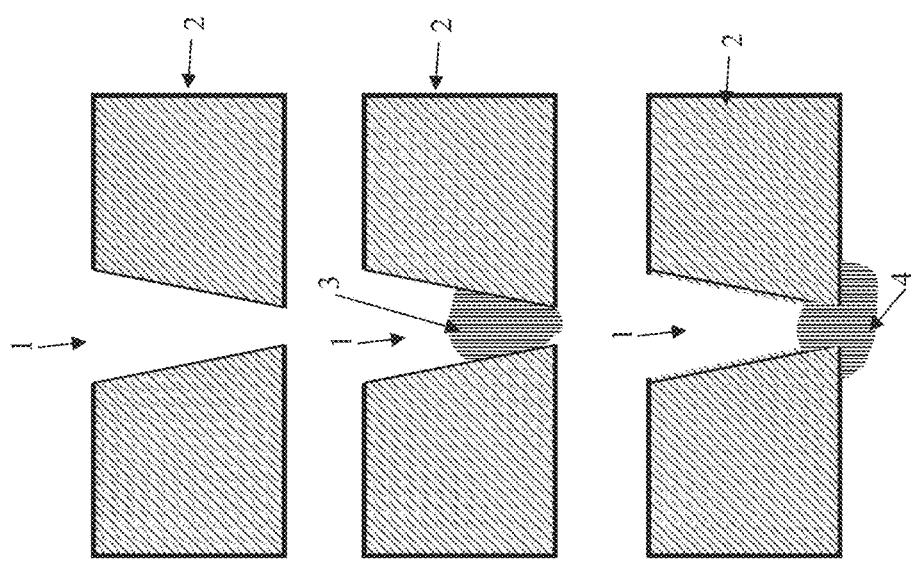
Fig. 1

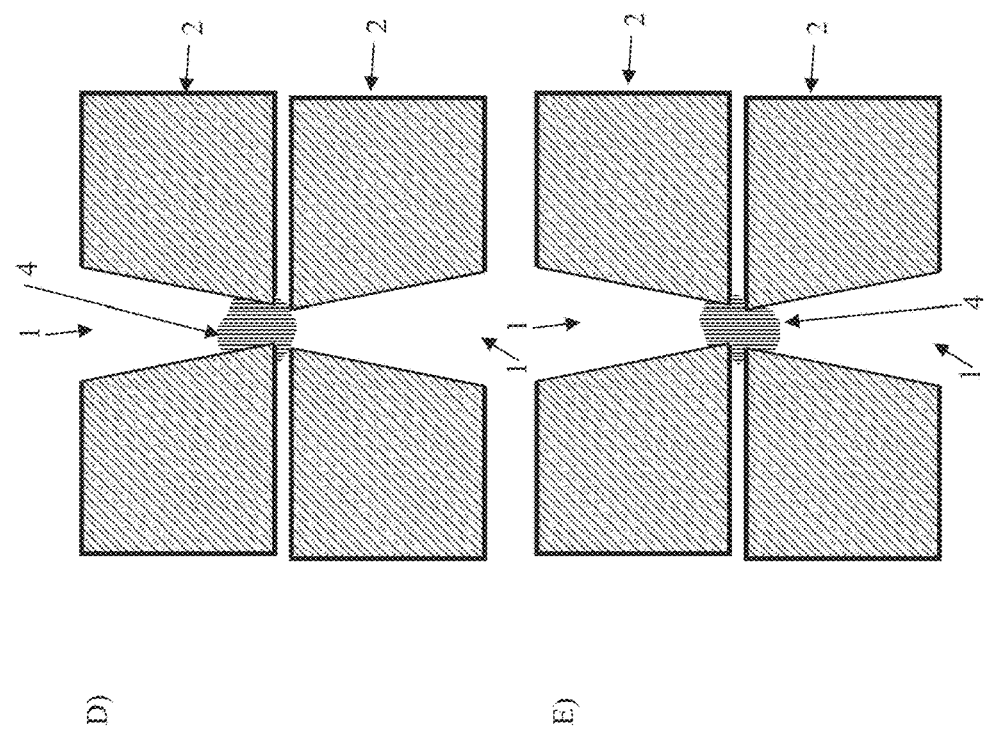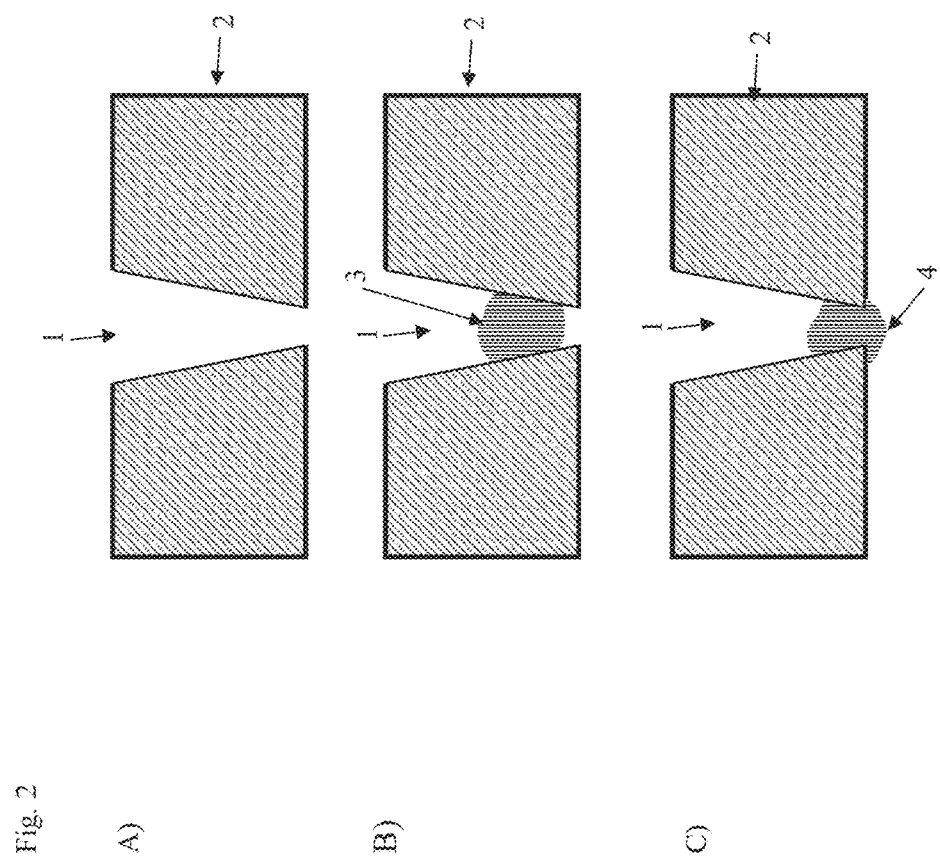
Fig. 2

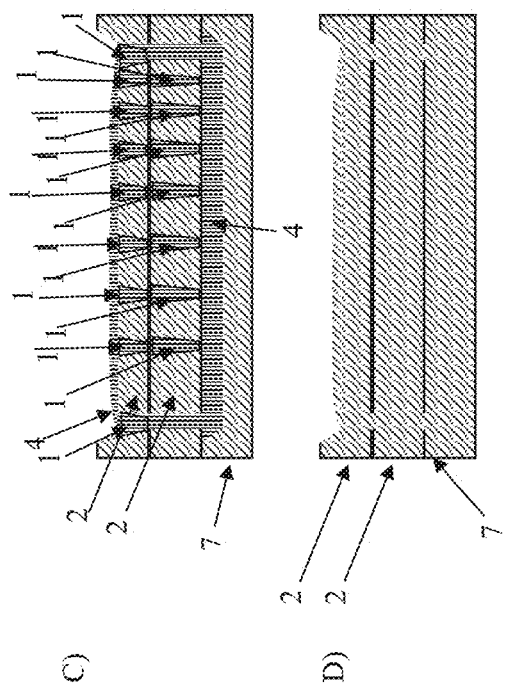
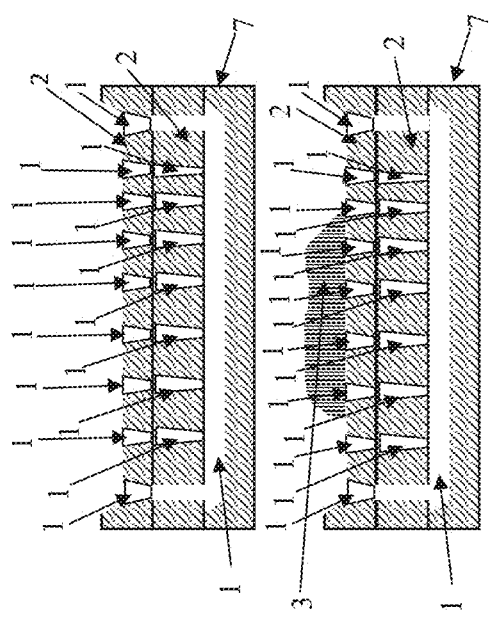
Fig. 4

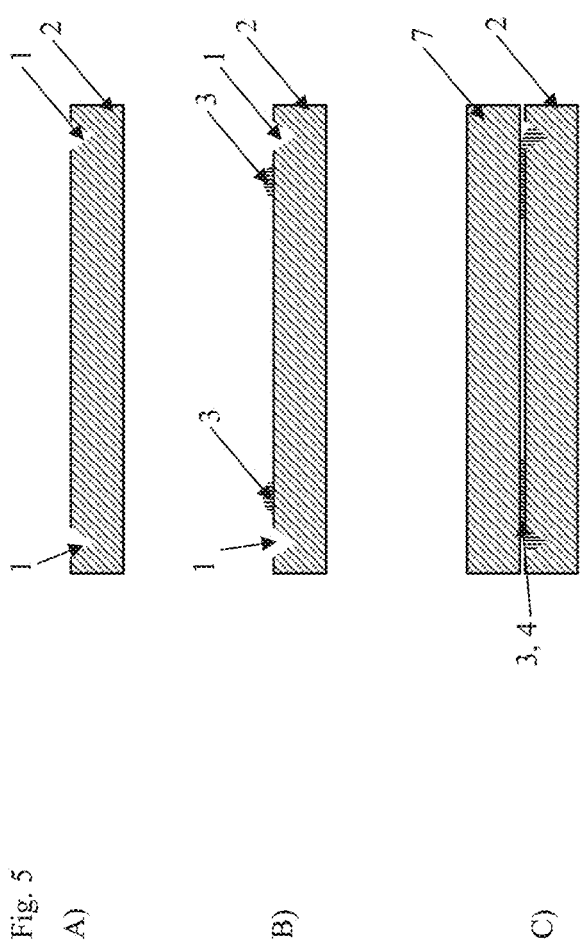
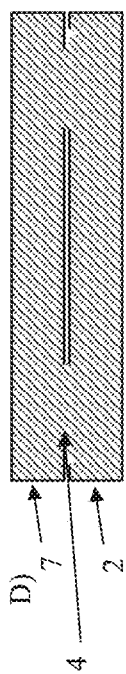
Fig. 5

SITE-SPECIFIC CONNECTING OF GLASS SUBSTRATES

The invention relates to a process for connecting glass substrates which allows glass substrates to be aligned in a site-specific manner and to subsequently be connected to one another, and to the site-specifically aligned and interconnected glass substrates. Generally, the process relates to connecting glass substrates to one another, optionally also without site-specific alignment. The interconnected glass substrates obtainable by processes according to the invention are characterized by a firm bond with one another, which is preferably formed by solidified glass solder that is in form-fitting engagement with the glass substrates. Therein, recesses, which are preformed in the glass substrate, with glass solder are used for aligning and optionally for connecting the glass substrates. Further, the invention relates to a process for producing areas of different composition and/or of different structure in glass substrates, and to glass substrates having areas of different composition and/or of different structure.

Further, the invention relates to the production of a connection of two glass substrates, which are in particular plate-shaped glass, and to the interconnected glass substrates. The connection is formed with form-fit between the glass substrates and is preferably without plastic.

STATE OF THE ART

CN 201 288 133 Y describes, according to a computer translation, the closing of tapered holes located in one of two or more parallel window glass panes between which vacuum is present. The tapered holes are closed by inserting a ball into the tapered section and subsequent filling with low-melting glass frit.

OBJECT OF THE INVENTION

The invention has the object to provide alternative processes and glass substrates obtainable thereby, e.g. to provide an alternative connection between glass substrates and a process for their production. A further object is to provide a process and a glass substrate obtainable thereby, which site-specifically has a different composition and/or structure. Preferably, the process shall be suitable to be carried out without exerting pressure on the glass substrates.

DESCRIPTION OF THE INVENTION

In the processes, recesses in glass substrates, which are preferably flat glass plates, are at least partially provided with glass solder and subsequently heated to a temperature at which the glass solder melts at least partially. The recesses extend through the thickness of the substrate and are open on both opposing surfaces of the glass substrate. The recesses are characterized in that they have an at least sectionally tapering cross-section, preferably a cross-section which extends through the glass substrate in a V-shape, optionally with irregularly tapered inner surfaces, more preferably with evenly extending inner surfaces, in particular with inner surfaces which extend slightly convex between the surfaces of the glass substrate or with inner surfaces having a linear pitch or extending in a straight line. Optionally, the recesses are arranged with their central axis, which can be a central plane, inclined at an angle of up to 60°, up to 45° or up to 30° or up to 10° to the surfaces of the glass substrate, preferably the recesses are arranged with their central axis, which can be a central plane, in perpendicular to the surfaces of the glass substrate. Generally preferably, the recesses have inner walls extending symmetrically with respect to their central axis, which can be a central plane, e.g. in the case of recesses extending along the glass substrate in a channel-like manner. The recesses can be rotationally symmetrical to their central axis, e.g. frustoconical, or can extend in a channel-like manner along the central plane of their cross-section or resp. along the glass substrate, wherein their inner walls are preferably symmetrical to the central plane.

The invention achieves the object by the features of the claims and in particular provides a process comprising or consisting of the steps of
1. providing at least one glass substrate having spaced traversing and V-shaped tapered recesses,
2. applying glass solder onto the surface of the glass substrate in which the recesses have their larger cross-section,
3. heating the glass substrate with the glass solder applied thereto, wherein preferably the recesses are arranged with the area of their smallest cross-section below their larger cross-section, and subsequent cooling, and/or the steps of
1. providing at least one glass substrate, optionally at least two glass substrates, having spaced recesses, preferably with at least one undercut in at least one of the recesses, preferably within each of the recesses,
2. applying glass solder onto one or at least two glass substrates in the area of the recesses and introducing the glass solder into the recesses,
3. heating the assembly comprising at least two glass substrates to a temperature at which the glass solder melts, and subsequent cooling to produce solidified glass solder, in particular solidified glass frit in the recesses.

Between steps 2 and 3, the process includes
optionally arranging at least two glass substrates against one another so that recesses overlap to form a connection between them through the glass solder,
and/or
optionally arranging a glass element within a recess, wherein the glass solder can be applied onto the glass element and/or into the recess.

Generally, glass solder that after application onto the glass substrate is not introduced into its recesses and that rests on the surface of the glass substrate extending between the recesses can be removed before heating to a temperature at which the glass solder melts. In this way, the surface of the glass substrate, from which the recesses with the glass solder disposed therein extend, can be maintained or resp. produced without overlying glass solder, in particular without molten and subsequently solidified glass solder. The glass solder disposed in the recesses is glass solder solidified after heating to a temperature at which the glass solder melts and subsequent cooling.

The recesses can e.g. have, measured in the plane of a surface of the glass substrate, a cross-section in the range from 10 µm up to 1 mm, e.g. from 20 or from 50 µm up to 800 µm or up to 700 µm, up to 600 µm, up to 500 µm, up to 400 µm or 300 µm or up to 200 µm or up to 100 µm, in each case +50 µm and/or −50 µm. Generally preferably, glass substrates with recesses have a plurality of recesses, e.g. at least 2, e.g. at least 10. at least 20, at least 100 or at least 200 recesses, e.g. over a distance of at least 1 cm or at least 2 cm, e.g. over 2 to 20 cm or up to 10 cm. Generally, recesses can be arranged at a distance of 0.2 to 2 mm, e.g. over a distance of at least 1 cm or at least 2 cm, e.g. over 2 to 20 cm or up to 10 cm.

Further optionally, the process after step 3 additionally or alternatively comprises applying and introducing ceramic or metal into the recesses at least partially filled by solidified glass solder, optionally with subsequent removal of the solidified glass solder to leave behind ceramic or metal in a form-fitting shape within the recesses of the glass substrate. Therein, ceramic and/or metal can be applied as a mass onto or into the recesses that are at least partially filled with solidified glass solder. Therein, ceramic and/or metal can be applied or introduced as at least one precursor compound of ceramic and/or metal, e.g. as a mass with precursor compounds for ceramic and; or metal, e.g. with subsequent reduction in the case of precursor compounds for metal or subsequent oxidation in the case of precursor compounds for ceramic.

Further optionally, the process after step 3 additionally or alternatively comprises applying and introducing reactive compounds, e.g. protein, nucleic acids, or inorganic catalyst, into the recesses filled by solidified glass solder.

Optionally, the glass solder has at least two types of glass particles, at least one of which has a melting temperature below the softening temperature or below the melting temperature of the glass substrate. The other type may have a melting temperature equal to or above the softening temperature or the melting temperature of the glass substrate, such that the lower temperature melting type encloses and fixates the higher temperature melting type within the recesses.

The glass substrates have recesses, each having at least one undercut, wherein recesses are arranged overlapping or resp. aligned with one another. Preferably, the recesses of the glass substrates, at least a number of recesses, lie congruently over one another. The recesses can extend from the surface of each glass substrate into its interior volume to form blind holes, and preferably the recesses are recesses traversing through each glass substrate. Traversing recesses are generally those that extend over the full distance between opposing surfaces of the glass substrate, wherein their cross-sections are each open in the planes of the opposing surfaces of the glass substrate.

The glass substrate having recesses is preferably provided by treating a glass substrate with laser pulses at the locations where recesses are to be created, and subsequently etching the glass substrate. This is because laser pulses produce modifications, e.g. structural changes, in the glass substrate, which are dissolved more quickly during the subsequent etching than non-laser-irradiated areas. For glass substrates, laser pulses having a wavelength at which the glass substrate has a high transmission are suitable, for instance a wavelength of 1064 nm, e.g. with pulse lengths of at most 100 ps or of at most 50 ps, preferably at most 10 ps. The laser source is operated in pulsed mode, the laser beam is moved over the glass substrate in sections or resp. with interruptions. The spacing of the pulses irradiated onto the glass substrate is set by the pulse frequency and the speed of movement of the laser beam over the glass substrate.

The etching can be carried out with hydrofluoric acid, e.g. 1 to 20 wt. % and/or sulfuric acid and/or hydrochloric acid and/or phosphoric acid, and/or potassium hydroxide solution, at e.g. 5 to 40° C. The creation of recesses, which preferably traverse through the glass substrate, by irradiating the glass substrate with laser pulses with subsequent etching has the advantage that the glass substrate does not have any cracks or stresses produced by these process steps.

The glass substrate can be planar and, in particular prior to irradiation with laser pulses and prior to etching, e.g. have a thickness of up to 800 µm, preferably 100 to 800 µm, e.g. 300 to 500 µm, after etching e.g. a thickness that is smaller by 50 to 700 or by up to 200 µm and traversing recesses in the laser-irradiated areas. In the production of recesses by laser pulses and subsequent etching, such traversing recesses can be substantially cylindrical, e.g. with a small angle, e.g. from 3° to 15° tapering conically from the surface of the glass substrate into the glass volume or resp. towards the opposite surface of the glass substrate.

The recesses have at least one undercut, which is preferably formed by the area of smallest cross-section of the recess in exactly one plane of the surface of the glass substrate. An undercut is then a recess traversing through the glass substrate, so that the one surface forms the undercut for entering glass solder which is applied onto the glass substrate from the opposite surface. Alternatively or additionally, an undercut can be formed by the recess widening within the glass substrate, in particular widening towards the surface of the glass substrate lying opposite to the surface onto which the glass solder is applied. Alternatively or additionally, an undercut can be formed by the recess tapering and then widening, e.g. in each case conically. Conically tapered recesses extending from the surface into a glass substrate are formed by etching a glass substrate along the positions irradiated by laser pulses, as the etching reaction progresses from the glass surface into the glass volume along the positions irradiated and therefore close to the glass surface has a longer exposure time. Since the etching reaction acts on all, or both, opposing surfaces of the glass substrate, this results in a cross-section tapering from the surface of the glass substrate, e.g. to a smallest cross-section that lies between the surfaces of the glass substrate and widens towards the opposing surface. Accordingly, an undercut is preferably arranged within a recess. Preferred recesses are slots or trenches having a V-shaped cross-section, frustoconical breaches, or breaches having an area of smallest cross-section within the glass substrate, also referred to as an hourglass-shaped cross-section. The recesses can have this cross-section, which extends between opposing surfaces of a glass substrate, with a round cross-section lying in perpendicular thereto, e.g. forming borings through the glass substrate, or having an elongated cross-section lying in perpendicular thereto, e.g. forming elongated holes along the glass substrate.

Due to the shape of the recesses, which preferably have an area of smallest cross-section in the plane of exactly one surface of the glass substrate, towards which the recesses run or resp. taper from the surface of the glass substrate opposite the plane, glass solder that is molten and solidified is fixed in the recesses form-fittingly, optionally also materially fixed. Therein, it has shown that glass solder applied onto the recesses moves into the area of the smallest cross-section of the recesses when heated to melting temperature and, in particular upon arranging the glass substrate with the area of smallest cross-section of the recesses facing downward, glass solder extends beyond the surface of the glass substrate, e.g. in the form of a drop protruding beyond the surface of the glass substrate and extending over the area of smallest cross-section into the recess. This is currently attributed to the effect of capillary forces. As the glass substrate cools, the glass solder solidifies so that another glass substrate can be arranged on top of it and aligned with its recesses fitting over the solidified glass solder that protrudes beyond the surface of the one glass substrate. In this way, an aligned assembly of two glass substrates is produced, a first one of which has recesses beyond which solidified glass solder protrudes and a second one of which has recesses matchingly arranged over the glass solder protruding beyond the surface of the first glass substrate. (FIG. 1) Optionally, the assembly can subsequently be heated to the melting temperature of the glass solder, whereby the solidified glass solder liquefies and flows into the matchingly arranged recesses of the glass substrate adjacent thereto so that, after renewed cooling, a form-fitting connection between the glass substrates is generated by the solidified glass solder extending through two abutting matching recesses adjacent to one another. Optionally, the solidified glass solder can extend beyond the plane of the surface of glass substrates only in the area of the recesses and therefore not extend between the facing surfaces of two glass substrates and not rest on the surfaces of glass substrates, and/or not extend outside the cross-section of the recesses between glass substrates. Preferably, the facing surfaces of the glass substrates lie directly on top of one another or are arranged at a distance from one another, preferably without either or both of these facing surfaces directly abutting to solidified glass solder.

When a further glass substrate is arranged on the surface of a glass substrate so that at least a portion of the recesses are aligned and their respective areas of smallest cross-section are arranged adjacent to one another, the melting of glass solder applied onto only one or both of the recesses causes the glass solder to flow into the adjacent areas of smallest cross-section of the recesses and extends into both recesses. Because the glass solder extends across the areas of smallest cross-section, it forms a form-fitting connection between the glass substrates.

The recesses are arranged e.g. at a distance from one another which amounts to at least 10%, at least 20% or at least 50% or at least 200% of the cross-section or resp. of the diameter of the recess, measured in the plane of a surface of the glass substrate. The distance can e.g. be up to the 20-fold or up to the 15-fold or up to the 10-fold, e.g. up to 200% or up to 100% or up to 50% of the cross-section or resp. of the diameter of the recess, measured in the plane of a surface of the glass substrate.

The glass solder is preferably a paste or powder having a content of or consisting of glass frit. The glass frit has a melting temperature that is below the melting temperature, preferably below the softening temperature of the glass substrate. Presently, glass frit is e.g. a composition comprising glass frit, e.g. in the form of a powder or paste, having a content of glass particles which are one type of glass having one melting point or at least two types of glass having different melting points.

It has shown that it is sufficient to introduce glass solder into the edge region of recesses of a class substrate, optionally of only exactly one glass substrate. This is because the glass solder is drawn into the recess during melting, which is due to capillary forces. The recesses are arranged in such a way that their areas with the smallest internal cross-section face one another or are adjacent to one another. It has shown that molten glass solder flows into the area of smallest cross-section or resp. diameter of the recesses and solidifies there during cooling. Thereby, a form-fitting connection is formed between the glass substrates, which consists of the molten and solidified glass solder, in particular glass frit, arranged in the recesses. (FIG. 2)

Optionally, two or more, e.g. three, four or more, glass substrates can be connected together, wherein the connecting of adjacent glass substrates can be carried out successively or simultaneously by applying glass solder onto one or at least two glass substrates in the area of the recesses and introducing the glass solder into the recesses, arranging at least two glass substrates next to one another so that their recesses overlap, and heating the assembly with at least two glass substrates to a temperature at which the glass solder melts, and subsequent cooling. This is because it has shown that glass solder, once melted, which is located in the area of the smallest cross-section of two recesses formed between two adjacent glass substrates, remains in this area even when re-melted, and re-solidifies there during cooling. For production of an assembly of two or three or more glass substrates, a second glass substrate can be arranged on the glass substrate, on the surface of the glass substrate opposite to the surface in which the recesses have their larger cross-section and to which glass solder is applied. Therein, the glass substrates are arranged with at least a part of their recesses matching one another. The second glass substrate can be arranged with its recesses such that their areas of smallest cross-section preferably face towards or away from the glass substrate to which glass solder is applied, wherein optionally glass solder can pass through the recesses of the second glass substrate and emerge on the opposite surface so that this forms an undercut.

A first glass substrate can have a recess that is a blind hole into which there is arranged a second glass substrate having at least one traversing recess that has at least one undercut, in particular formed in that the area of smallest cross-section of the traversing recess lies in the surface of the second glass substrate that faces the first glass substrate. Optionally, glass solder can be applied between the first and second glass substrates and/or onto the second glass substrate, preferably only onto the surface of the second glass substrate that lies opposite the first glass substrate. This is because during the heating of step 3 to the melting temperature of the glass solder, the glass solder flows through the recesses of the second glass substrate into the interspace between the first and second glass substrates. Generally preferably, the first glass substrate has an undercut in its recess such that solidifying glass solder engages with the undercut arranged within the recess. In this embodiment, an assembly of two glass substrates is obtainable in which a second glass substrate is arranged at least sectionally or flush in the recess of a first glass substrate, which recess can be a blind hole, wherein solidified glass solder engages form-fittingly with traversing recesses of the second glass substrate and is arranged form-fittingly in the recess of the first glass substrate, preferably engages form-fittingly with an undercut of the recess of the first glass substrate. Preferably, the second glass substrate has a plurality of traversing recesses, e.g. at least 10 recesses, which are spaced apart from one another by a maximum of 20 mm, preferably by a maximum of 10 mm or by a maximum of 5 or a maximum of 3 mm. (FIG. 3 for a first glass substrate and a second glass substrate in its recess; FIG. 4 for a first glass substrate and two second glass substrates in its recess).

The application of the glass solder can be done by doctoring, spraying, floating, e.g. by placing a glass substrate onto glass solder, printing processes, e.g. by screen printing, or targeted, spot-shaped spraying onto several locations. Alternatively, glass solder can be applied by coating a stamp with protruding areas, e.g. ridges, with glass solder on the protruding areas and then pressing onto the glass substrate to apply the glass solder from the protruding areas onto the glass substrate.

Optionally, at least one of the glass substrates or both of the glass substrates that are adjacent to one another can have recesses, e.g. trenches or single or linearly arranged holes beside the recesses that are aligned with recesses of another glass substrate and connected with glass solder.

Optionally, the recesses extending through the glass substrate and into which glass solder is applied may be connected to channel-like blind holes on a surface of the glass substrate, which is preferably the surface in which the large cross-sections or diameters of the recesses are located. Glass solder is also introduced into such channel-like blind holes during the application of glass solder in step 2. When heating the glass substrate in step 3, liquid glass solder flows along such channel-like blind holes into the recesses extending through the glass substrate. Channel-like blind holes in the surface of the glass substrate, in which surface the large cross-sections of the recesses extending through the glass substrate are located, and which are connected to the recesses extending through the glass substrate, have the advantage of supplying applied glass solder to them. In general, the glass substrate having recesses in the form of blind holes is preferably arranged below the glass substrate having traversing recesses.

Further, glass substrates can have further recesses, e.g. blind holes, at a spacing from recesses provided with glass solder. Such spaced recesses in the form of blind holes, which preferably do not contain glass solder, can reduce the spreading of molten glass solder to other areas of the glass substrates. In a simple embodiment, a glass substrate has recesses that are blind holes. Applying glass solder to the blind holes, arranging another glass substrate that optionally does not have recesses, preferably has recesses, and subsequently heating this assembly to at least the melting temperature of the glass solder leads to the glass solder flowing into the recesses, so that a site-specific bond is formed between the glass substrates by the glass solder along the blind holes. The blind-hole-shaped recesses preferably have a V-shaped cross-section and farther preferably form channels in the surface of the glass substrate. Glass solder applied to the surface of the glass substrate is limited in spreading by the recesses during pressing of a second glass substrate, which optionally has no recesses. Moreover, during the heating in step 3, molten glass solder that is not held between the glass substrates can be drawn into the recesses. In this embodiment, a composite of glass substrates can be produced that are connected by molten and solidified glass solder extending along the channel-like recess between the glass substrates and/or extending only up to and into the channel-like recess. FIG. 5 shows this embodiment schematically.

Preferably, the glass solder after melting and solidifying, and the glass substrates have substantially the same coefficient of thermal expansion. The heating in step 3 can be done by means of a furnace, by irradiation, e.g. by means of lasers or infrared lamps. Optionally, a radiation absorber can be added to the glass solder.

In one embodiment, areas of different composition are formed in a glass substrate, which composition is formed of glass solder that at least in part is melted and solidified in recesses of the glass substrate, wherein the solidified glass solder can optionally subsequently be coated. Alternatively, the cavities of the solidified glass solder can be filled with metal, wherein optionally subsequently the glass solder is removed, e.g. by etching, and porous metal is left behind in the recesses. Further, the invention relates to the glass substrates obtainable by the process, the glass substrates having inside of recesses an area of different composition, in particular solidified glass solder and/or metal. Preferably, glass solder or resp. glass frit, which may comprise one type of glass or at least two types of glass having different melting points, is introduced into recesses of the glass substrate. Preferably, the recesses extend traversing across the thickness of the glass substrate. Optionally, glass frit applied to the closed surface of the glass substrate outside of the recesses can remain there or can be removed. During heating to the melting temperature of the glass frit. In the case of glass frit containing at least two types of glass having different melting temperatures, it is preferred to heat only to the lower melting temperature so that the higher melting glass type of the frit is not melted and is glued by the lower melting glass type and forms cavities. In this embodiment, the glass substrate has a porous solidified structure of glass frit in its recesses. Such a glass substrate can e.g. be used as a filter.

The figures show in

Figure 6:
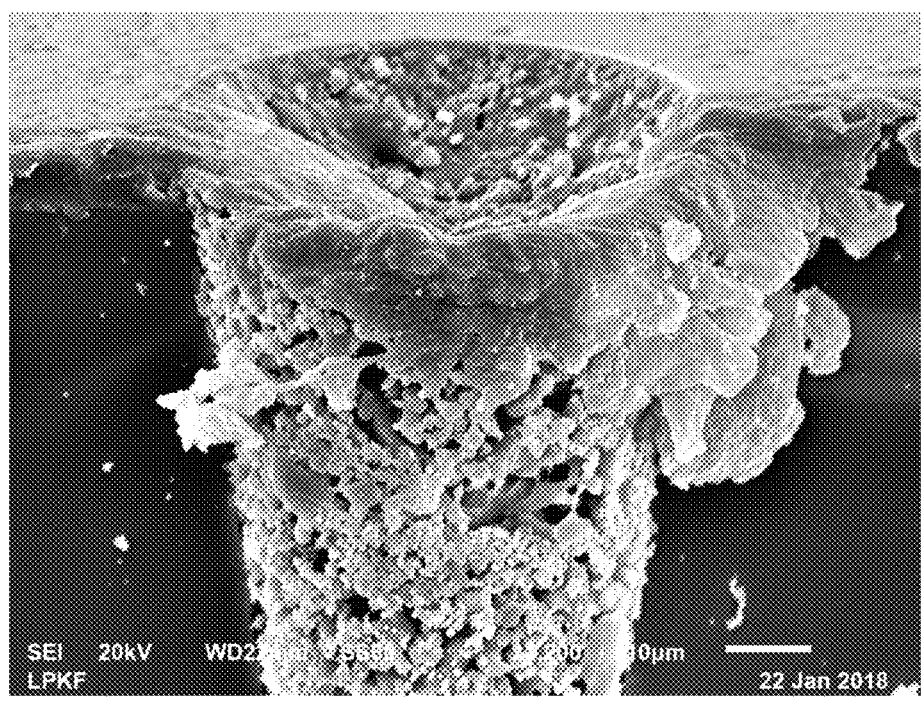

FIG. 1 A) to D) schematically an embodiment,

FIG. 2 A) to E) schematically an embodiment,

FIG. 3 A) to D) schematically a further embodiment,

FIG. 4 A) to D) schematically a further embodiment,

FIG. 5 A) to D) schematically a further embodiment,

FIG. 6 an electron micrograph of an embodiment, and

Figure 7:
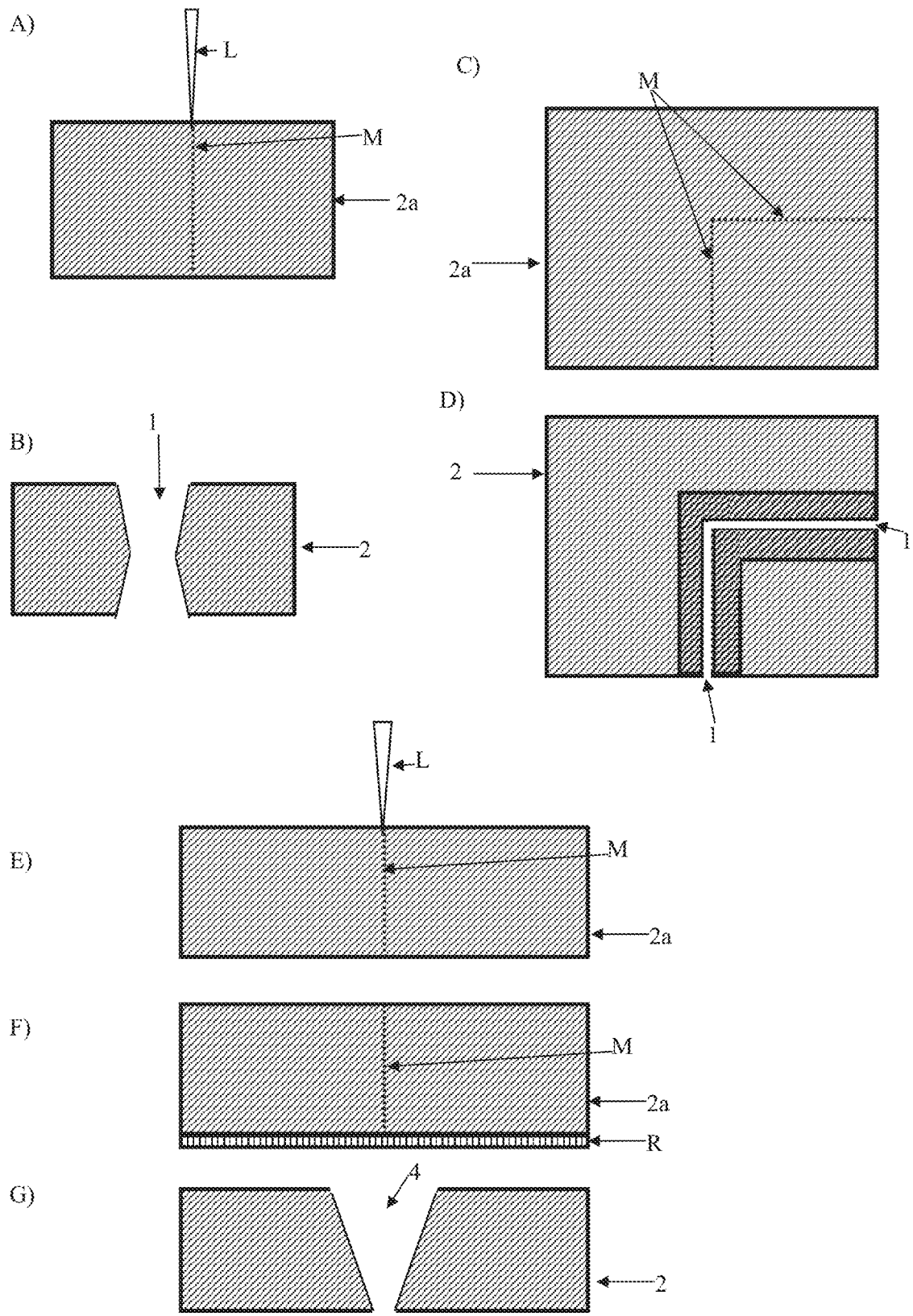

FIG. 7 schematically a preferred process for producing glass substrates with recesses.

FIG. 1 in A) shows a glass substrate 2 having a V-shaped recess 1, into which in B) glass frit paste 3 is introduced as glass solder, e.g. by a printing process or doctoring. The glass frit paste 3 is melted by heating and, after cooling, forms solidified glass solder 4 which protrudes beyond the plane of the glass substrate 2 in the area of the small cross-section of the recess 1 (FIG. 1C). A second glass substrate 5 can be arranged with its recesses 6 matching over the glass solder 4 which from the recesses 1 protrudes over the first glass substrate 2.

FIG. 2 in A) shows a glass substrate 2 having a V-shaped recess 1, into which in B) glass frit paste 3 is introduced, which is melted by heating in the furnace to its melting temperature, which is below the softening temperature of the glass substrate 2, and is subsequently cooled to solidified glass solder 4, which from the recess protrudes over the plane of the glass substrate 2, as shown in FIG. 2 C). After arranging a second glass substrate 5 matchingly with its recesses 6 over the solidified glass solder 4 (FIG. 2D), by renewed heating, e.g. in the furnace, a connection of the glass substrates 2, 5 can be created consisting of the solidified glass solder 4 extending into the matchingly aligned recesses 1, 6 of the two glass substrates 2, 5 (FIG. 2E). Therein, the recesses 1, 6 of the glass substrates 2, 5 are arranged with their surfaces adjacent to one another, in each of which the areas of the smallest cross-sections of their recesses are located.

FIG. 3 shows connecting of a first glass substrate 7 shown in FIG. 3A to a second glass substrate 2 having traversing recesses 1, each with an undercut within it. The first glass substrate has recesses 1 which traverse through its thickness or which extend only for a portion into the thickness of the glass substrate 7, forming blind holes. As shown in FIG. 3 A), the recesses 1 of the first glass substrate 7 are preferably aligned to match the recesses 1 of the second glass substrate 2, so that the recesses 1 of both glass substrates 2, 7 at least for a fraction overlap. FIG. 3 in the first glass substrate 7 shows a recess 1 which is formed trench-shaped, does not traverse completely through the first glass substrate 7, and extends in parallel to the plane of representation, while the recesses 1 of the second glass substrate with undercut are formed conically round or elongated as elongated holes, which e.g. are arranged in perpendicular to the recesses 1 of the first glass substrate 7. The second glass substrate 2 has traversing recesses, each of which is V-shaped and faces the first glass substrate 7 with its smaller cross-sectional opening.

Glass solder in the form of glass frit 3 is applied (FIG. 3B) onto the surface of the second glass substrate 2 that lies opposite to the first glass substrate 7. Thereby, the glass solder is applied into the larger cross-sections of the recesses, which are preferably line-shaped. Subsequent melting of the glass solder (FIG. 3C), e.g. by heating in a furnace, leads to the distribution of the molten glass solder through the recesses 1, which traverse through the thickness of the second glass substrate 2, and into the interspace between the first glass substrate 7 and the second glass substrate 2, optionally onto the surface of the second glass substrate 2 that lies opposite to the first glass substrate 7. The cooling results in solidification of the glass solder 4 (FIG. 3D) and in the form-fitting connection of the recesses of the second glass substrate 2 to the first glass substrate 7.

Alternatively or additionally, the first glass substrate 7 can have a blind-hole-like recess in which a second glass substrate 2 is arranged at least sectionally. Therein, the first glass substrate 7 preferably has a blind hole with an undercut 8 into which solidified glass solder 4 can extend.

The second 21 has substrate 2 has traversing recesses, each of which is V-shaped and with its smaller cross-sectional opening faces the first glass substrate 7. Glass solder in the form of glass frit 3 is applied (FIG. 3B) onto the surface of the second glass substrate 2 that lies opposite to the first glass substrate 7. Thereby, the glass solder is applied into the larger cross-sections of the recesses, which are preferably line-shaped. Subsequent melting of the glass solder (FIG. 3C), e.g. by heating in a furnace, results in the distribution of the molten glass solder through the recesses 1 traversing through the thickness of the second glass substrate 2 and into the interspace between the first glass substrate 7 and the second glass substrate 2, optionally onto the surface of the second glass substrate 2 that lies opposite to the first glass substrate 7. The cooling leads to the solidification of the glass solder 4 (FIG. 3D) and to the form-fitting connection of the recesses of the second glass substrate 2 with the first glass substrate 7.

FIG. 4A) shows the assembly of two glass substrates 2, each having traversing V-shaped recesses 1, above a glass substrate 7 having V-shaped recesses 1. The recesses 1 of the glass substrates 2, 7 overlap at least partially. The recesses of the glass substrates 2 with their smaller cross sections each face the glass substrate 7 lying below, so that the V-shaped recesses 1 of the glass substrates 2 lying above form undercuts for solidified glass solder. The recesses 1 in the glass substrate 7 lying below can traverse through it or, as shown, be in the form of long holes or resp. blind holes which run in perpendicular to the recesses 1 arranged in the glass substrates 2 lying above. FIG. 4B) shows the application of glass solder in the form of glass frit 3 onto the surface of the upper glass substrate 2. The melting of the glass solder 4 (FIG. 4C) leads to its distribution in the recesses 1 of the two second glass substrates 2 and between the lower one of the second glass substrates 2 and recesses in the first glass substrate 7, optionally including its undercut 8. The form-fitting and preferably material-fitting connection in the assembly of two glass substrates 2 with a further glass substrate 7 with solidified glass solder 4 arranged in between, which glass solder 4 extends through the recesses 1 of the second glass substrates 2, is shown in FIG. 4D).

Alternatively, the recess formed in the glass substrate 7 can have the form of a blind hole which preferably has an undercut 8 into which glass solder 4 can flow and solidify therein. Therein the glass substrates 2 can be arranged in this blind hole and can be form-fittingly connected to the glass substrate 7, in which the blind hole is formed, by solidified glass solder 4 extending through their recesses 1 and into the recess of the blind hole.

FIG. 5A) shows a process of connecting a glass substrate 2 which has a recess 1 in the form of a V-shaped trench along its peripheral edge. Therein, the recess 1 can be traversing or can extend only for a fraction of the thickness of the glass substrate 2. After applying glass solder 3 within the surface area of the glass substrate 2 encompassed by the trench, e.g. by printing next to and/or into the recess 1 (FIG. 5B), a further glass substrate 7, which optionally has traversing recesses with undercuts or has an uninterrupted surface, is loaded against the glass substrate 2 so that the glass solder 3 is distributed between the glass substrates 2, 7 and in the direction of the peripheral edge is stopped in spreading by the V-shaped trench (FIG. 5B). By melting the glass solder 3 and subsequent cooling, solidified glass solder 4 is formed between the glass substrates 2, 7 (FIG. 5C), which glass solder preferably extends into recesses of at least one, optionally of both glass substrates 2, 7. Thereby, the solidified glass solder 4 connects the glass substrates 2, 7 in a form-fitting and preferably force-fitting manner (FIG. 5D).

FIG. 6 shows an electron micrograph of a longitudinal section along a frustoconical recess traversing through a glass substrate, wherein in the recess a solidified mixture of a glass frit with 5% low-melting glass type and 95% higher-melting glass type forms a porous structure that fills the recess. The glass substrate was heated to the melting temperature of the low-melting glass type of the frit.

FIG. 7 A) in sectional view shows a process for generating recesses 1 in a glass substrate 2 by irradiating an original glass substrate 2a with laser radiation L at the locations where recesses 1 are to be generated. The laser beam L, which is generally preferably a sequence of laser pulses, penetrates the glass substrate 2a up to a depth dependent on the focal position and generates a modification M therein. FIG. 7 B) in sectional view illustrates that the subsequent etching of the glass substrate 2a generates the recesses 1 in the glass substrate 2. In particular by irradiating the laser beam L up to a small distance in front of or as far as through the opposite surface of the glass substrate 2, a traversing recess is created during the subsequent etching.

FIG. 7 C) and D) in the top view onto the glass substrate 2 illustrate that along the line-shaped modification M, e.g. from laser radiation formed by laser pulses irradiated side by side, during the subsequent etching microstructures in the form of trench-shaped recesses 1 are produced. Trench-shaped recesses can also be formed traversing through the thickness of the glass substrate 2.

FIGS. 7 E) to G) show an alternative process generating recesses 1, in which process an original glass substrate 2a is penetrated by laser radiation L through the cross-section of the glass substrate 2a to generate a modification M extending through the cross-section of the glass substrate 2. A surface of the glass substrate 2 is coated with etch resist R, e.g. lacquer or plastic film. During subsequent etching, the glass substrate 2 is not affected on the surface coated by etch resist R, so that the generated recess 1 extends into the glass substrate 2 from the surface that lies opposite to the etch resist R. Subsequently, the etch resist R is preferably removed.

The invention claimed is:

1. A process comprising steps of:
   providing at least one glass substrate having spaced traversing and V-shaped tapered recesses each having a larger cross-section at a surface of the glass substrate and a smallest cross section opposite the larger cross-section, applying glass solder onto the surface of the glass substrate in which the recesses have their larger cross-section, heating the glass substrate with the glass solder applied thereto, and subsequently cooling the glass substrate with the glass solder applied thereto, wherein the cooling creates solidified glass solder that protrudes beyond the surface of the glass substrate adjacent to an area of smallest cross-section of the recess, the method comprising arranging another glass substrate with recesses matching over the solidified glass solder, subsequently heating to the melting temperature of the glass solder and subsequent cooling whereby the glass solder extends with form-fit through at least the areas of smallest cross-section of the matchingly arranged recesses of the glass substrates.

2. A process comprising steps of:

arranging at least two glass substrates, each of the at least two glass substrates having spaced traversing and V-shaped tapered recesses each having a larger cross-section at a surface of the glass substrate and a smallest cross section opposite the larger cross-section, wherein the arranging arranges the at least two glass substrates such that facing surfaces of the at least two glass substrates directly contact each other with their recesses matching one another, so that their areas of smallest cross-section face one another, applying glass solder onto the surface having the larger cross-section of at least one of the at least two glass substrates, and subsequently heating and then cooling the at least two glass substrates.

3. The process according to claim 1, comprising removing glass solder outside the recesses from the surface of the glass substrate prior to heating the glass substrate.

4. The process according to claim 1, wherein the recesses are arranged with the area of their smallest cross-section below their larger cross-section during the heating.

5. The process according to claim 1, wherein the traversing recesses are connected to channels that are formed blind-hole-shaped with a V-shaped cross-section in the surface of the glass substrate in which the larger cross-sections of the traversing recesses are arranged.

6. The process according to claim 1, wherein the glass substrate has blind-hole-shaped recesses with a V-shaped cross-section which form channels in the surface of the glass substrate and which are spaced from the V-shaped tapered recesses.

7. The process according to claim 1, comprising arranging another glass substrate having recesses in the form of blind holes on the surface of the glass substrate opposite the surface to which glass solder is applied, wherein the recesses of the glass substrates at least for a fraction overlap.

8. The process according to claim 1, wherein the substrate is arranged in a recess which is formed in a blind hole of another glass substrate, wherein the blind hole comprises an undercut into which glass solder flows during the heating.

9. The process according to claim 1, wherein the at least one glass substrate comprises traversing recesses with a V-shaped cross-section as an undercut.

10. The process according to claim 1, wherein the glass frit comprises at least two glass types with different melting temperatures, and the heating is conducted only to the melting temperature of the glass type with the lower melting temperature.

11. The process according to claim 1, comprising introducing a mass containing or consisting of metal and/or ceramic into the recesses.

12. The process according to claim 11, comprising removing solidified glass solder after the introducing of the mass.

13. An assembly, comprising at least two glass substrates, a traversing recesses in each of the at least two glass substrates, the traversing recesses having an undercut that extends from a surface of its respective glass substrate, a surface of another one of the at least two glass substrates being in direct contact with the surface of the respective glass substrate, and solidified glass solder extending along and into the recess between the at least two glass substrates; wherein:

each of the traversing recesses has a largest cross-section at one surface of its respective substrate and a smallest cross-section at an opposite surface of its respective substrate;

the solidified glass solder protrudes beyond the surface of the at least two glass substrates from smallest cross-section of the traversing recesses and abuts against and adjacent substrate;

wherein the smallest cross-section of the traversing recesses of adjacent ones of the at least two glass substrates are aligned with each other over the solidified glass solder.

14. The assembly according to claim 13, wherein least one of the at least two glass substrates comprises at least 2 recesses which have a cross-section, measured at the surface of the glass substrate, in the range from 10 μm to 1 mm.

* * * * *